US012078118B2

(12) United States Patent
Nishiyama et al.

(10) Patent No.: US 12,078,118 B2
(45) Date of Patent: Sep. 3, 2024

(54) CONTROL METHOD AND CONTROL DEVICE FOR INTERNAL COMBUSTION ENGINE FOR VEHICLE

(71) Applicants: Nissan Motor Co., Ltd., Yokohama (JP); JATCO LTD, Fuji (JP)

(72) Inventors: Tetsuya Nishiyama, Kanagawa (JP); Daigo Kishi, Kanagawa (JP); Tatsuo Nakano, Kanagawa (JP); Seiichirou Takahashi, Isehara (JP); Koji Saito, Machida (JP); Yukiyoshi Inuta, Isehara (JP); Takao Arimatsu, Ebina (JP); Yasuhiro Endo, Isehara (JP)

(73) Assignees: Nissan Motor Co., Ltd., Yokohama (JP); Jatco Ltd., Fuji (JP)

( * ) Notice: Subject to any disclaimer, the term of this patent is extended or adjusted under 35 U.S.C. 154(b) by 0 days.

(21) Appl. No.: 18/262,202

(22) PCT Filed: Nov. 29, 2021

(86) PCT No.: PCT/JP2021/043519

§ 371 (c)(1),
(2) Date: Jul. 20, 2023

(87) PCT Pub. No.: WO2022/158119

PCT Pub. Date: Jul. 28, 2022

(65) Prior Publication Data

US 2024/0084753 A1 Mar. 14, 2024

(30) Foreign Application Priority Data

Jan. 22, 2021 (JP) ................................ 2021-008383

(51) Int. Cl.
*F02D 41/02* (2006.01)
*F02D 41/10* (2006.01)

(52) U.S. Cl.
CPC ........... *F02D 41/022* (2013.01); *F02D 41/10* (2013.01); *F02D 2200/1002* (2013.01); *F02D 2200/501* (2013.01); *F02D 2200/602* (2013.01)

(58) Field of Classification Search
CPC ............ F02D 41/10; F02D 2200/1002; F02D 2400/12; B60W 2510/0241
See application file for complete search history.

(56) References Cited

U.S. PATENT DOCUMENTS 7,101,313 B2 * 9/2006 Kresse ................ B60W 10/115
701/87

FOREIGN PATENT DOCUMENTS

DE 202015005586 U1 * 2/2016 ........... B60W 10/06
JP 2006-125213 A 5/2006
JP 2007-327477 A 12/2007

OTHER PUBLICATIONS

DE 202015005586 U1.*

* cited by examiner

*Primary Examiner* — Derek D Knight
(74) *Attorney, Agent, or Firm* — Global IP Counselors, LLP

(57) ABSTRACT

A control device and method controls a vehicle having an internal combustion engine connected to an automatic transmission via a torque converter with a lockup device. The torque of the internal combustion engine is limited the by a torque limit value based on a speed difference between an input rotational speed and an output rotational speed of the torque converter during acceleration in a non-lockup state. The torque-limiting of the internal combustion engine is prohibited torque-limiting upon a prescribed condition being met. The prescribed condition is met by a heating request, during hill climbing/towing, during travel at high vehicle speeds, when the accelerator pedal opening angle exceeds or is equal to a prescribed opening angle, when the torque limit value is greater than a target torque, in a range other than a D range, or in a mode other than normal mode.

10 Claims, 6 Drawing Sheets

CONTROL METHOD AND CONTROL DEVICE FOR INTERNAL COMBUSTION ENGINE FOR VEHICLE

CROSS-REFERENCE TO RELATED APPLICATIONS

This application is a U.S. national stage application of International Application No. PCT/JP2021/043519, filed on Nov. 29, 2021, which claims priority to Japanese Patent Application No. 2021-008383 filed in Japan on Jan. 22, 2021.

BACKGROUND

Technical Field

The present invention relates to a control of a vehicle having an internal combustion engine connected to an automatic transmission via a torque converter with a lockup device.

Background Information

Japanese Laid-Open Patent Application No. 2006-125213 (Patent Document 1) discloses a technology in which, in a configuration in which an internal combustion engine is connected to an automatic transmission via a torque converter with a lockup device, at the time of acceleration in a non-lockup region, such as immediately after starting a vehicle, the torque output by the internal combustion engine is restricted to be lower than the torque corresponding to the accelerator pedal opening angle input by the driver, thereby suppressing the excessive revving (increase in rotational speed) of the internal combustion engine.

However, in the prior art described above, because the torque of the internal combustion engine is continuously restricted during acceleration in the non-lockup state, and, depending on the situation, problems may occur, such as insufficient driving force of the vehicle, the driver's inability to obtain the intended acceleration performance, etc.

SUMMARY

In the present invention, in the control of an internal combustion engine of a vehicle in which the torque of the internal combustion engine is limited during acceleration in a non-lockup state, the above-described limiting of torque is prohibited when prescribed conditions are met.

By prohibiting the limiting of torque even in the non-lockup state under certain conditions, the necessary torque can be obtained while allowing of the internal combustion engine to rev under these conditions, thereby enabling control in accordance with the situation.

BRIEF DESCRIPTION OF THE DRAWINGS

Referring now to the attached drawings which form a part of this original disclosure.

DETAILED DESCRIPTION OF EMBODIMENTS

An embodiment of the present invention will be described in detail below based on the drawings.

Figure 1:
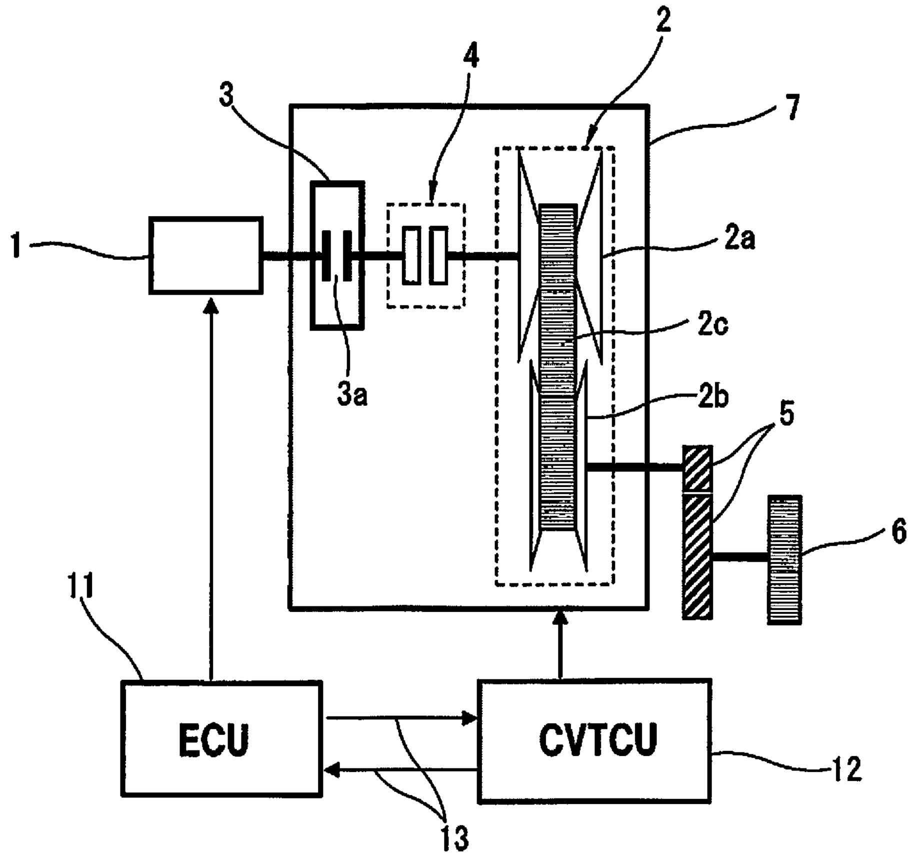
FIG. 1 is an explanatory diagram showing the configuration of a power train of a vehicle according to the present invention.

FIG. 1 is an explanatory diagram illustrating the configuration of the power train of a vehicle to which the present invention is applied. The power train includes an internal combustion engine 1 as the drive source, a belt-type continuously variable transmission (variator) 2 as an automatic transmission, and a torque converter 3 positioned between the internal combustion engine 1 and the continuously variable transmission 2. The internal combustion engine 1 can either be a gasoline engine or a diesel engine but is in one embodiment a gasoline engine, that is, a spark-ignition internal combustion engine. The automatic transmission can be a stepped transmission.

The torque converter 3 is provided with a lockup clutch **3*a* that can directly connect a pump impeller acting as an input element and a turbine acting as an output element, and this lockup clutch 3*a* is engaged and disengaged by hydraulic control based on an output signal of the transmission controller 12**.

The continuously variable transmission 2 comprises a primary pulley **2*a* on the drive side, a secondary pulley 2*b* on the driven side, and a metal belt 2*c* wound between the two; the pulley width of the primary pulley 2*a* can be adjusted using hydraulic pressure and the pulley width of the secondary pulley 2*b* changes accordingly, thereby carrying out shifting in a stepless manner. A transmission input shaft serving as the rotary shaft of the primary pulley 2*a* is connected to the output shaft of the torque converter 3 via a forward/reverse switching mechanism 4 that uses a planetary gear mechanism. Further, the transmission output shaft acting as the rotary shaft of the secondary pulley 2*b* described above transmits power to drive wheels 6 via a final gear 5 and a differential gear, not shown. The transmission ratio of the continuously variable transmission 2 is controlled by the transmission controller 12** primarily based on the accelerator pedal opening angle and vehicle speed.

The continuously variable transmission 2, the forward/reverse switching mechanism 4, and the torque converter 3 are housed in a single housing 7 and are installed in the vehicle body together with the internal combustion engine 1.

Fuel injection, ignition, etc., of the internal combustion engine 1 is controlled by the engine controller 11. The engine controller 11 and the transmission controller 12 are connected to each other via an in-vehicle network 13, such as CAN communication and send and receive the necessary signals to each other.

Various sensors, switches, and the like, which are not shown are connected to the controllers 11, 12. For example, an accelerator opening angle sensor that detects the opening angle of the accelerator pedal controlled by the driver, a vehicle speed sensor that detects the vehicle speed, an engine rotation speed sensor that detects the rotational speed of the internal combustion engine 1, a turbine rotation speed sensor that detects the rotational speed of the turbine of the torque converter 3 (that is, the rotational speed of the input shaft of the continuously variable transmission 2), a water temperature sensor that detects the cooling water temperature of the internal combustion engine 1, and the like, are provided.

Engagement and disengagement of the lockup clutch 3*a* of the torque converter 3 are controlled based on various driving conditions, such as the vehicle speed and the accelerator pedal opening angle, for example, entering the non-lockup state during starting acceleration, and entering the lockup state during steady travel.

Then, during acceleration of the internal combustion engine 1 when the lockup clutch 3*a* is in the non-lockup state, torque of the internal combustion engine 1 is limited in order to suppress excessive revving (increase in rotation speed) of the internal combustion engine 1 caused by slipping of the torque converter 3. That is, the actual torque of the internal combustion engine 1 is limited to be relatively low compared to a target torque corresponding to the accelerator pedal opening angle. This torque-limiting of the internal combustion engine 1 is carried out based on a torque limit value supplied to the engine controller 11 by the transmission controller 12. That is, the transmission controller 12 calculates the torque limit value required for suppressing revving based on the speed difference between the input rotational speed (that is, the rotation speed of the internal combustion engine 1) and the output rotational speed (that is, the transmission input rotational speed) of the torque converter 3, and outputs the torque limit value to the engine controller 11. The engine controller 11 executes torque-limiting such that the output torque follows this torque limit value.

The limitation of the torque can be carried out by appropriate means, such as reducing the throttle opening angle (including reducing the fuel injection amount), retarding the ignition timing, or the like.

Here, in the present embodiment, the limitation of the torque during acceleration in the non-lockup state can be prohibited when a prohibited condition is detected.

Figure 2:
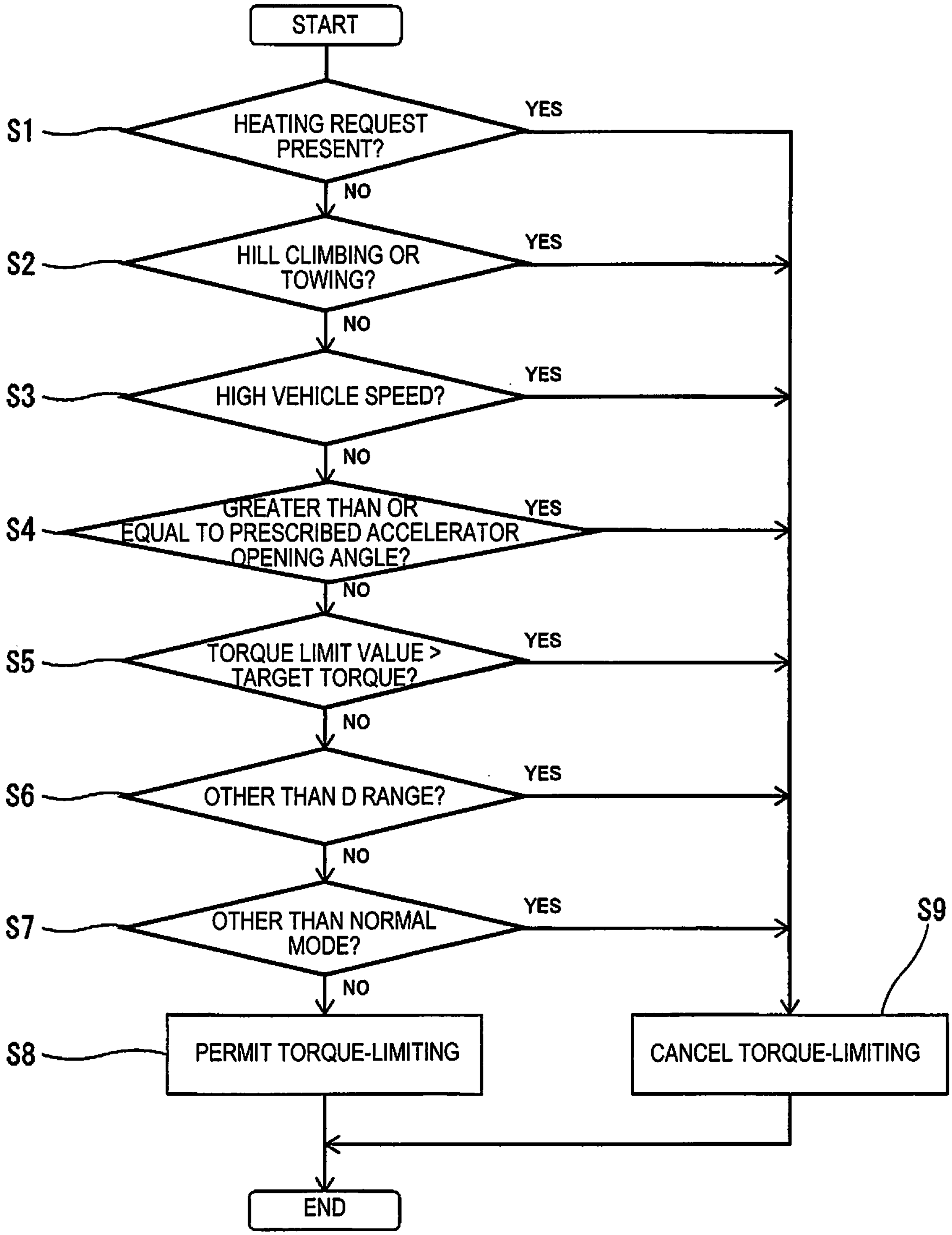
FIG. 2 is a flowchart showing a processing sequence for prohibiting torque-limiting during acceleration in a non-lockup state.

FIG. 2 is a flowchart showing the processing sequence of a prohibition process for prohibiting torque-limiting. The engine controller 11 sets and resets a flag indicating whether to prohibit torque-limiting (including cancellation) in accordance with the flowchart.

In Step S1, it is determined whether there is a heating request in a vehicle air-conditioning system, not shown. The presence/absence of a heating request is determined based on a signal supplied to the engine controller 11 by the air-conditioning system. If there is a heating request, torque-limiting is prohibited in order to ensure the cooling water temperature. That is, if there is a heating request, the process proceeds from Step S1 to Step S9 and torque-limiting is prohibited or canceled. If there is no heating request, the process proceeds to Step S2.

In Step S2, it is determined whether the vehicle is climbing a hill or towing. If the vehicle is climbing a hill or towing, the process proceeds to Step S9, and torque-limiting is prohibited or canceled. Whether the vehicle is climbing a hill can be determined by, for example, detecting the inclination of the vehicle with a gravity sensor, detecting that the vehicle is traveling on an uphill road by means of a GPS system using high-precision map data etc. Further, whether the vehicle is in a towing state in which it is towing another vehicle can be determined, for example, by an input, such as from a switch provided in the vehicle's towing equipment that turns on during towing, a switch provided in the driver's seat operated by the driver, etc.

When the vehicle is climbing a hill or towing, ensuring the driving force of the vehicle becomes a priority, so that limiting the torque is prohibited. If the vehicle is not climbing a hill or towing, the process proceeds to Step S3.

In Step S3, it is determined whether the vehicle is in a high-speed state in which the vehicle speed is greater than or equal to a prescribed speed. If the vehicle is in a high-speed state, the process proceeds to Step S9 and torque-limiting is prohibited or canceled. That is, in a high-speed state, there is the risk that the torque will become insufficient for overtaking other vehicles, for example, so that torque-limiting is prohibited. If the vehicle is not in a high-speed state, the process proceeds to Step S4.

In Step S4, it is determined whether the accelerator pedal opening angle is greater than or equal to a prescribed opening angle. If it is greater than or equal to a prescribed opening angle, the process proceeds to Step S9, and torque-limiting is prohibited or canceled. The "prescribed opening angle" in this case is an opening angle that is greater than an accelerator pedal opening angle corresponding to an acceleration at which torque-limiting could occur in the non-lockup state. In other words, a situation in which the driver is depressing the accelerator pedal to a large opening angle means that the driver is demanding sufficient acceleration performance; thus, the securing of driving force is given higher priority than the suppression of revving of the internal combustion engine 1. If the opening angle is not greater than or equal to a prescribed opening angle, the process proceeds to Step S5.

In Step S5, it is determined whether the torque limit value during torque-limiting exceeds the target torque corresponding to the accelerator pedal opening angle. If the torque limit value exceeds the target torque, the process proceeds to Step S9, and torque-limiting is prohibited or canceled. For example, if the rotational speed difference of the torque converter 3 in the non-lockup state decreases during start-up acceleration of the vehicle, the torque limit value is gradually set higher, becoming higher than the target torque. Limiting of the torque is terminated at this time. If the determination of Step S5 is NO, the process proceeds to Step S6.

In Step S6, it is determined whether the range position of the continuously variable transmission 2 is other than the D range (drive range). If it is other than the D range, such as a low-speed range or a reverse range, the process proceeds to Step S9, and torque-limiting is prohibited or canceled. For example, when the vehicle is in the low-speed range, acceleration performance is prioritized. If it is in the D range, the process proceeds to Step S7.

In Step S7, it is determined whether the shift mode of the continuously variable transmission 2 is other than the normal mode. If it is other than the normal mode, such as a sports mode, the process proceeds to Step S9 in order to prioritize vehicle acceleration performance, and torque-limiting is prohibited or canceled. If it is in the normal mode, the process proceeds to Step S8.

In Step S8, a prohibition flag indicating that torque-limiting should be prohibited is maintained in a reset state. In Step S9, the prohibition flag is reset, and torque-limiting is prohibited or canceled. As is clear from the flowchart of FIG. 2, in this embodiment, the plurality of prohibition conditions shown in steps 1-7 are in a so-called OR condition relationship, so that the prohibition flag is turned ON if any one of the conditions is satisfied.

Figure 3:
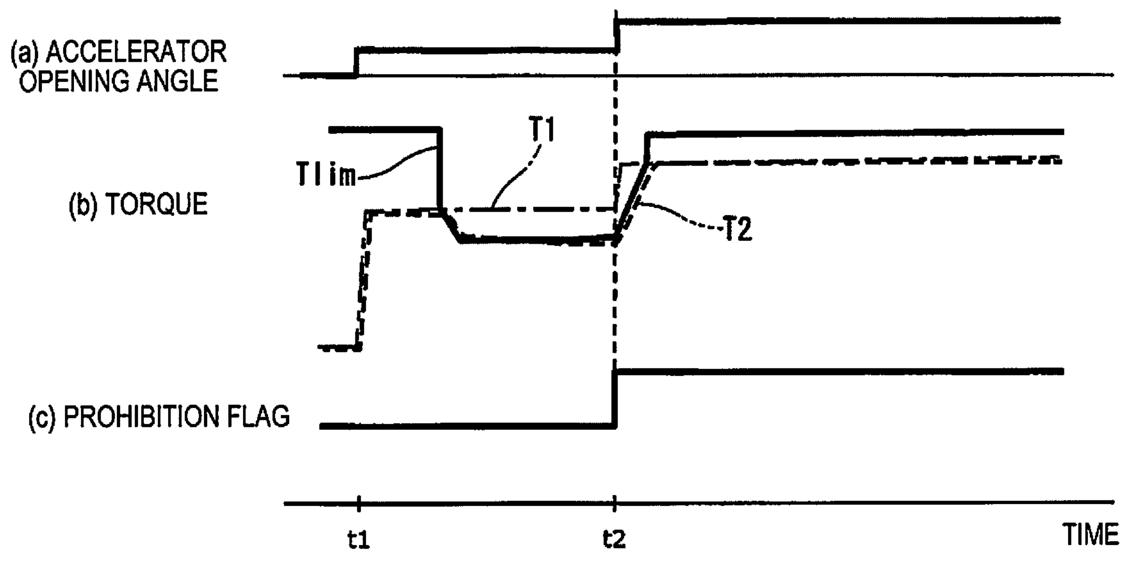
FIG. 3 is a time chart showing an example in which an accelerator pedal opening angle becomes greater than or equal to a prescribed opening angle, as one of the prohibited conditions.

An example in which the accelerator pedal opening angle becomes greater than or equal to a prescribed opening angle, as one of the prohibited conditions, will now be described based on the time chart of FIG. 3. This is the prohibited condition of step 4 described above. Although the state of the lockup clutch 3*a* is now shown in the figure, the lockup clutch 3*a* is in the non-lockup state during the period shown in the figure.

In the figure, (a) indicates the accelerator pedal opening angle, (b) indicates the torque, and (c) indicates the on/off state of the prohibition flag described above. (b) In the torque row, the characteristics of three values, target torque T1, actual torque T2, and torque limit value Tlim, are shown. The target torque T1 is a value of the torque corresponding to the accelerator pedal opening angle, in other words, the torque demanded by the driver by depression of the accelerator pedal. The actual torque T2 is the torque actually output by the internal combustion engine 1 after torque-limiting. Strictly speaking, the actual torque T2 is not a value obtained by directly measuring the torque but is estimated. The torque limit value Tlim is a torque value instructed by the transmission controller 12 to the engine controller 11 based on the rotational speed difference of the torque converter 3 in the non-lockup state. The torque limit value Tlim is sufficiently high, as shown in the figure, in the initial state, etc., when torque-limiting is not required.

When the accelerator pedal opening angle increases at time t1 and acceleration starts, the prohibition flag is in a reset state, but since the torque limit value Tlim is kept high, there is effectively no torque-limiting. Here, since the lockup clutch 3*a* is in a non-lockup state, the rotational speed difference between the input and output shafts of the torque converter 3 increases. For this reason, the torque limit value Tlim supplied to the engine controller 11 by the transmission controller 12 decreases, and the torque of the internal combustion engine 1 is limited accordingly. That is, the actual torque T2 becomes smaller than the target torque T1 corresponding to the accelerator pedal opening angle, thereby suppressing excessive revving of the internal combustion engine 1.

In the illustrated example, when it is detected that the accelerator pedal opening angle has become larger than a prescribed opening angle at time t2, the prohibition flag is turned ON. As a result, torque-limiting is canceled. As a result of the cancellation, the actual torque T2 accords with the target torque T1. That is, priority is given to securing driving force sufficient to obtain the driver's intended acceleration performance.

Like FIG. 3, FIGS. 4-9 show examples of time charts corresponding to each of the prohibited conditions of steps 1, 2, 3, 6, and 7 described above. In the time charts, changes in actual torque T2 are omitted. The actual torque T2 changes along the torque limit value Tlim during torque-limiting and follows the target torque T1 after torque-limiting is canceled.

Figure 4:
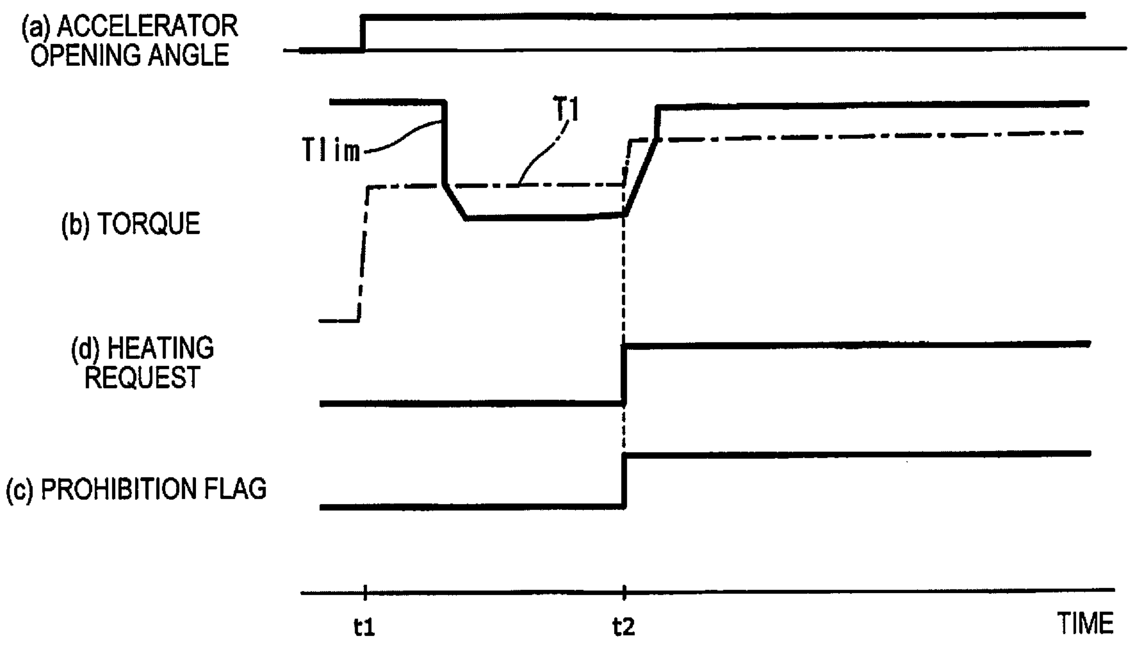
FIG. 4 is a time chart of an example in which a heating request is input as one of the prohibited conditions.

The time chart of FIG. 4 corresponds to the presence/absence of a heating request, and, as shown in row (d), when a heating request occurs at time t2, the prohibition flag is turned ON and torque-limiting is canceled. As a result, the internal combustion engine 1 is operated at relatively high torque, and the heat for heating is imparted to the cooling water.

Figure 5:
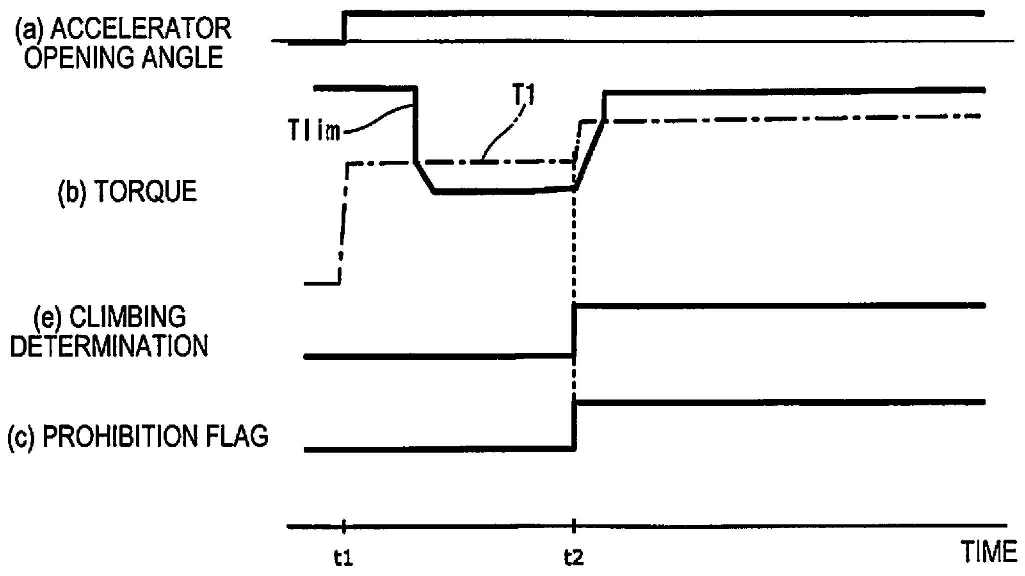
FIG. 5 is a time chart of an example in which an uphill determination is made as one of the prohibited conditions.

The time chart of FIG. 5 shows the prohibition of torque-limiting during hill climbing, and, as shown in row (e), when it is determined that the vehicle is climbing a hill at time t2, the prohibition flag is turned ON and the torque-limiting is canceled. A high driving force is thereby obtained.

Figure 6:
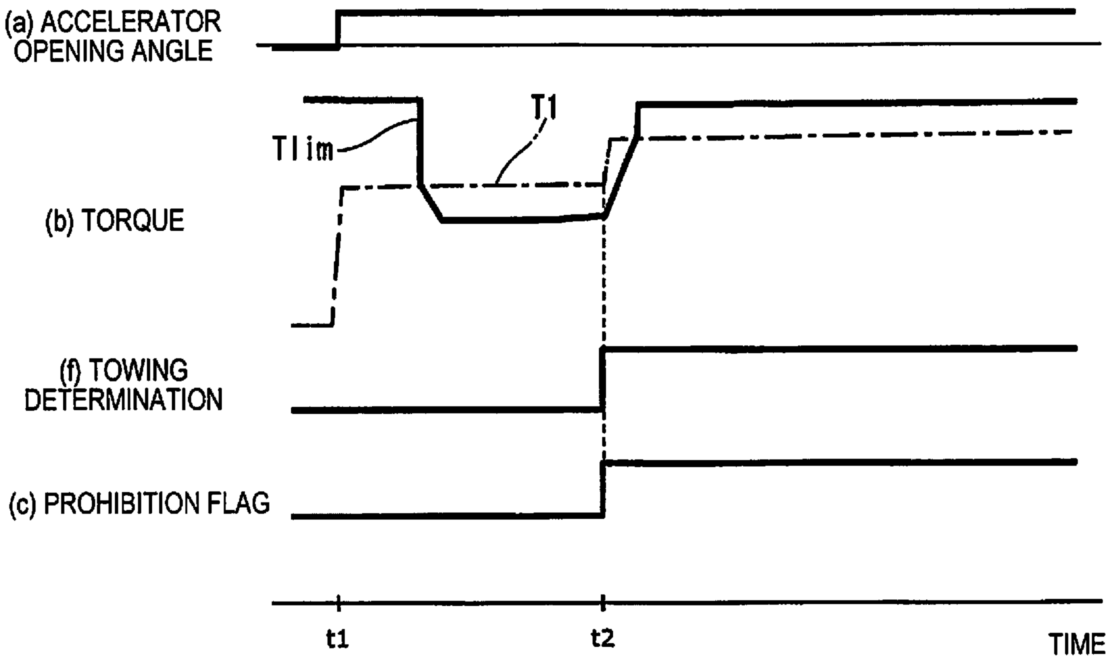
FIG. 6 is a time chart of an example in which a towing determination is made as one of the prohibited conditions.

The time chart of FIG. 6 shows the prohibition of torque-limiting during towing, and, as shown in row (f), when it is determined that the vehicle is towing at time t2, the prohibition flag is turned ON, and torque-limiting is canceled. A high driving force is thereby obtained.

Figure 7:
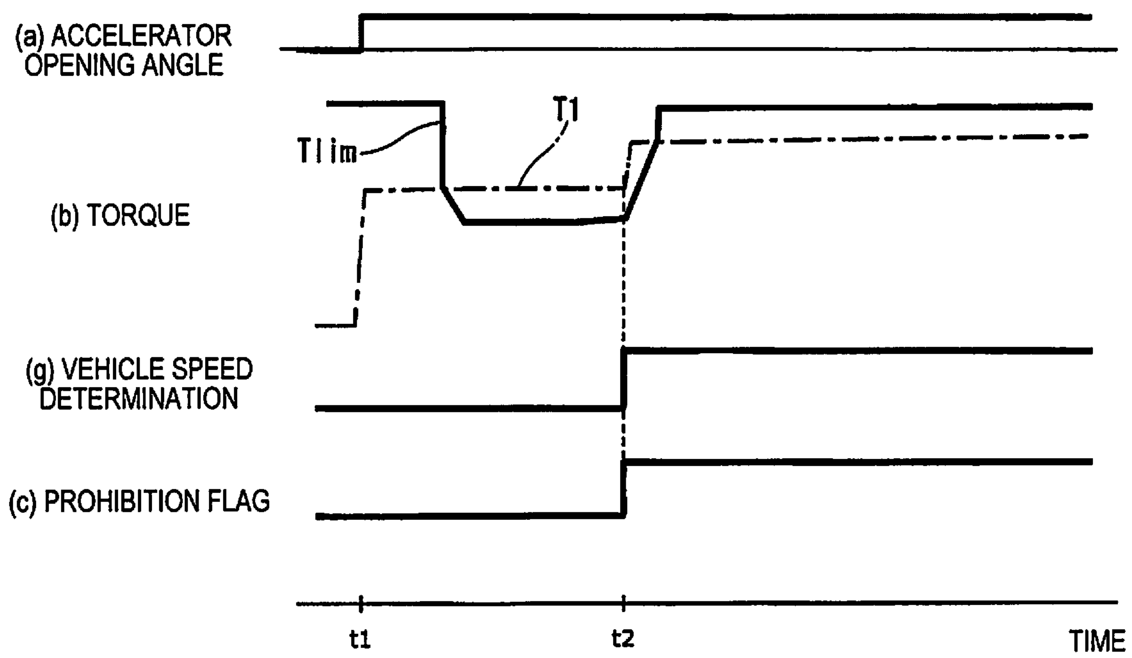
FIG. 7 is a time chart of an example in which a high vehicle speed determination is made as one of the prohibited conditions.

The time chart of FIG. 7 shows the prohibition of torque-limiting during high vehicle speed, and, as shown in row (g), when it is determined that the vehicle speed is greater than or equal to a prescribed vehicle speed at time t2, the prohibition flag is turned ON, and torque-limiting is canceled. A high driving force is thereby obtained during high vehicle speed.

Figure 8:
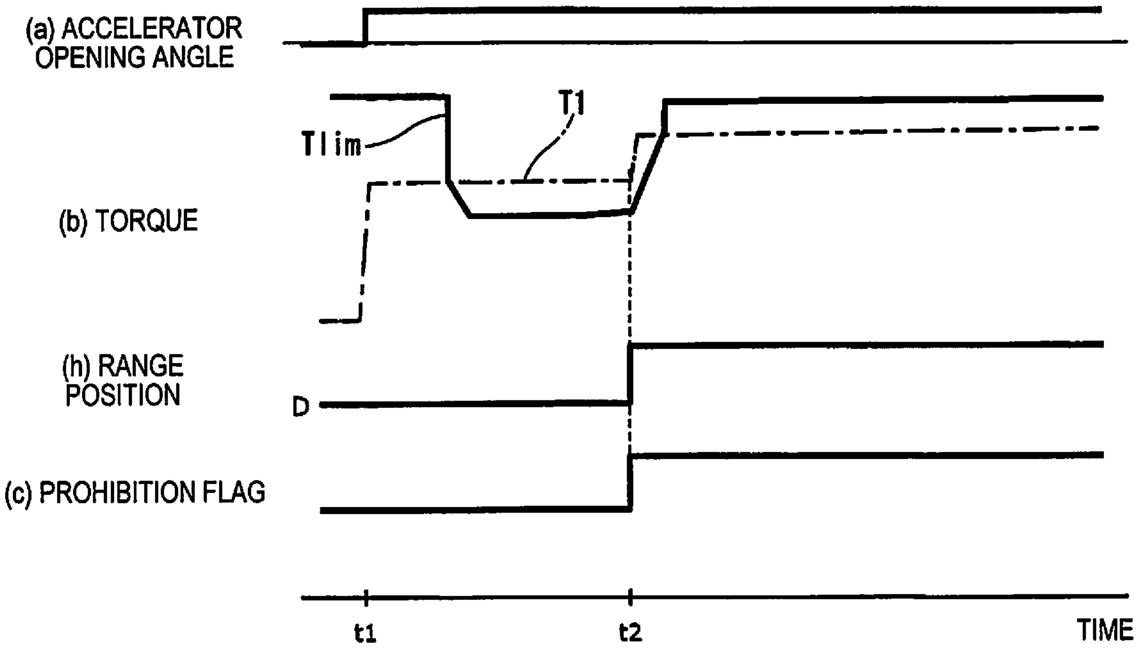
FIG. 8 is a time chart of an example in which one of the prohibited conditions is set to a range other than the D range.

The time chart of FIG. 8 shows prohibition of torque-limiting related to the range position of the continuously variable transmission 2, and, as shown in row (h), when it is determined that the range position is other than the D range (for example, low-speed range) at time t2, the prohibition flag is turned ON, and torque-limiting is canceled. As a result, a high driving force corresponding to the driver's intention can be obtained in a low-speed range, or the like.

Figure 9:
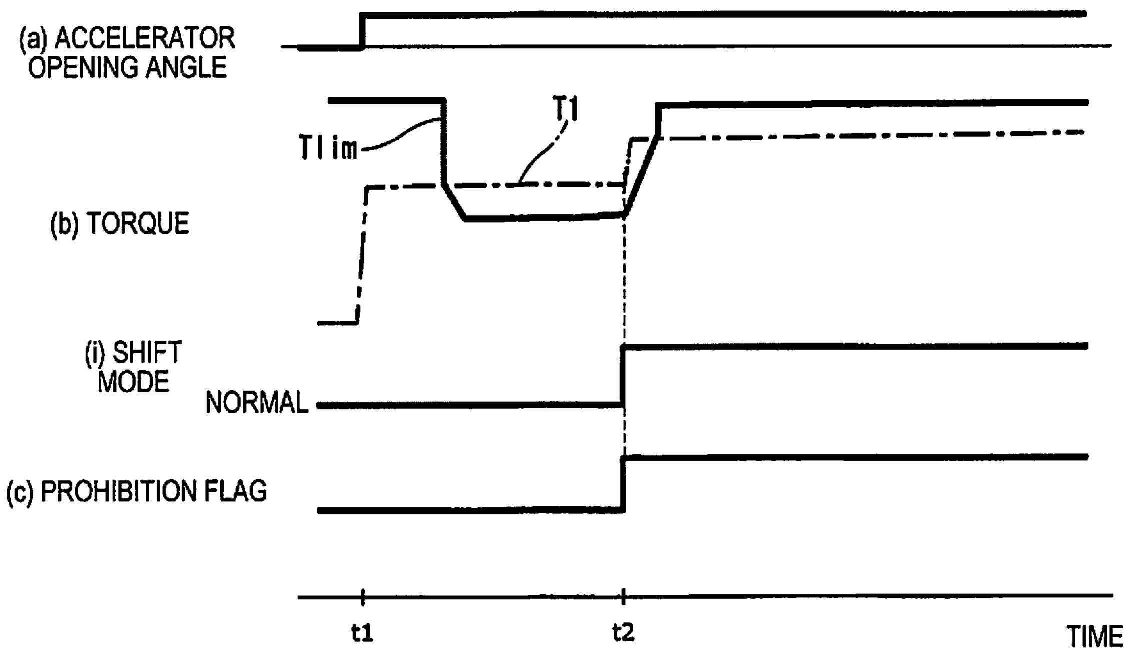
FIG. 9 is a time chart of an example in which one of the prohibited conditions is set to a mode other than the normal mode.

The time chart of FIG. 9 shows the prohibition of torque-limiting related to the shift mode of the continuously variable transmission 2, and, as shown in row (a), when it is determined that the shift mode is other than the normal mode (for example, sports mode) at time t2, the prohibition flag is turned ON and torque-limiting is canceled. As a result, a high driving force corresponding to the driver's intention can be obtained in the sports mode, etc.

In the time charts of FIGS. 4-9, torque-limiting is canceled as a result of the detection of certain prohibited conditions during the execution of torque-limiting, but if a prohibited condition is detected from the outset, torque-limiting is prohibited from the outset.

Figure 10:
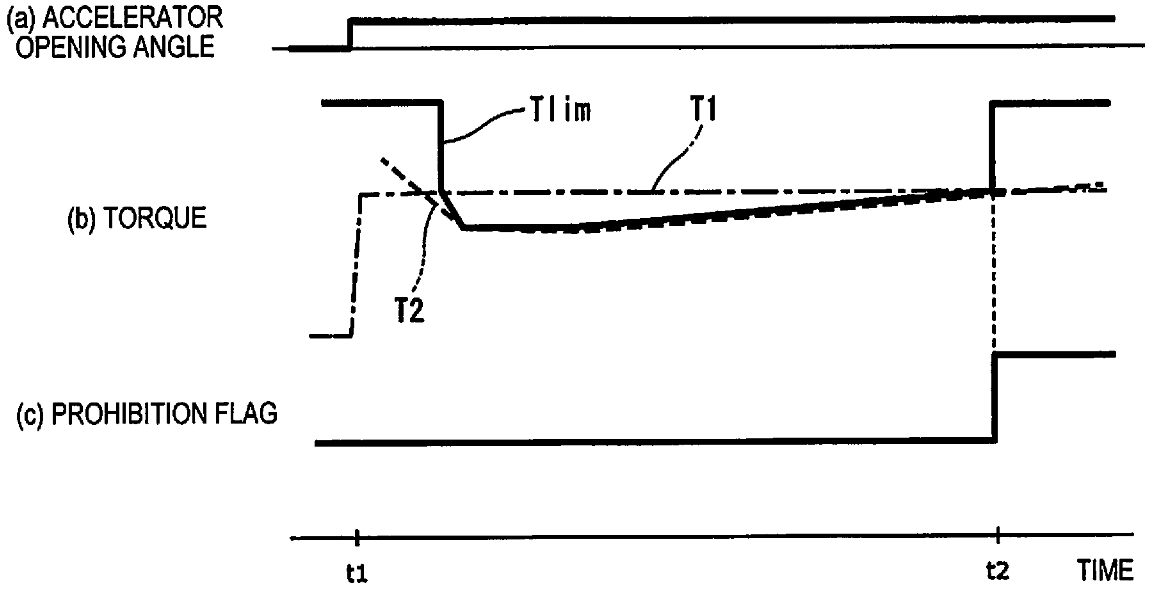
FIG. 10 is a time chart showing a situation in which the torque limit value exceeds the target torque.

The time chart of FIG. 10 shows cancellation of torque-limiting corresponding to step 5 of the time chart of FIG. 2. That is, after the accelerator pedal opening angle increases at time t1 and acceleration starts, the torque limit value Tlim is supplied and the torque of the internal combustion engine 1 is limited, as described above, but the torque limit value Tlim gradually increases as the rotational speed difference of the torque converter 3 decreases. In the illustrated example, the torque limit value Tlim exceeds the target torque T1 corresponding to the accelerator pedal opening angle at time t2, and the prohibition flag is turned ON and torque-limiting is thereby canceled.

The invention claimed is:

1. A control method for a vehicle having an internal combustion engine connected to an automatic transmission via a torque converter with a lockup device, the control method comprising:

limiting a torque of an internal combustion engine to a torque limit value based on a speed difference between an input rotational speed and an output rotational speed of the torque converter during acceleration in a non-lockup state, and prohibiting torque-limiting upon a prescribed condition being met.

2. The control method for according to claim 1, wherein the prescribed condition for the prohibiting of the torque-limiting is met when an accelerator opening angle is greater than or equal to a prescribed opening angle.

3. The control method according to claim 1, wherein the prescribed condition for the prohibiting of the torque-limiting is met when the vehicle is climbing a hill.

4. The control method according to claim 1, wherein the prescribed condition for the prohibiting of the torque-limiting is met when the vehicle is towing another vehicle.

5. The control method according to claim 1, wherein the prescribed condition for the prohibiting of the torque-limiting is met when a high vehicle speed is greater than or equal to a prescribed vehicle speed.

6. The control method according to claim 1, wherein the prescribed condition for the prohibiting of the torque-limiting is met when there is a heating demand of the vehicle as the prescribed condition.

7. The control method according to claim 1, wherein the prescribed condition for the prohibiting of the torque-limiting is met when the range position of the automatic transmission is other than a D range.

8. The control method according to claim 1, wherein the prescribed condition for the prohibiting of the torque-limiting is met when a shift mode of the automatic transmission is other than a normal mode.

9. The control method according to claim 1, wherein the torque-limiting is canceled when a target torque limit value during limiting after torque-limiting has started exceeds a target torque corresponding to an accelerator opening angle.

10. A control device for a vehicle internal combustion engine connected to an automatic transmission via a torque converter with a lockup device, the control device comprising:

a controller configured to control a torque of the internal combustion engine to the automatic transmission, the controller being configured to limit the torque of the internal combustion engine to a torque limit value based on the speed difference between an input rotational speed and an output rotational speed of the torque converter during acceleration in a non-lockup state, and the controller being further configured to prohibit torque-limiting upon a prescribed condition being met.

* * * * *